United States Patent
Guo et al.

(10) Patent No.: US 11,477,034 B2
(45) Date of Patent: Oct. 18, 2022

(54) METHOD AND APPARATUS FOR PROCESSING ACCOUNT INFORMATION IN BLOCK CHAIN, STORAGE MEDIUM, AND ELECTRONIC APPARATUS

(71) Applicant: TENCENT TECHNOLOGY (SHENZHEN) COMPANY LTD, Guangdong (CN)

(72) Inventors: Rui Guo, Shenzhen (CN); Mao Cai Li, Shenzhen (CN); Jian Jun Zhang, Shenzhen (CN); Hai Tao Tu, Shenzhen (CN); Qi Zhao, Shenzhen (CN); Zong You Wang, Shenzhen (CN); Jun Liang, Shenzhen (CN); Da Wei Zhu, Shenzhen (CN); Bin Hua Liu, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 231 days.

(21) Appl. No.: 16/993,985

(22) Filed: Aug. 14, 2020

(65) Prior Publication Data
US 2020/0374134 A1 Nov. 26, 2020

Related U.S. Application Data

(63) Continuation of application No. 16/371,480, filed on Apr. 1, 2019, now Pat. No. 10,785,038, which is a (Continued)

(30) Foreign Application Priority Data

Feb. 28, 2017 (CN) .......................... 201710120699.9

(51) Int. Cl.
*H04L 9/32* (2006.01)
*G06F 21/62* (2013.01)
(Continued)

(52) U.S. Cl.
CPC ........ *H04L 9/3247* (2013.01); *G06F 21/6245* (2013.01); *H04L 9/30* (2013.01)

(58) Field of Classification Search
CPC . H04L 9/3247; H04L 9/30; H04L 9/50; H04L 9/3239; H04L 9/3263; G06F 21/6245
See application file for complete search history.

(56) References Cited

U.S. PATENT DOCUMENTS 9,094,379 B1 * 7/2015 Miller ....................... H04L 9/14
10,068,228 B1 * 9/2018 Winklevoss .......... H04L 9/3239
(Continued)

FOREIGN PATENT DOCUMENTS

CN 105468994 A 4/2016
CN 106022917 A 10/2016
(Continued)

OTHER PUBLICATIONS

Office Action for corresponding CN 2017101206999.9 dated May 31, 2018.
(Continued)

*Primary Examiner* — Darren B Schwartz
(74) *Attorney, Agent, or Firm* — Sughrue Mion, PLLC

(57) ABSTRACT

A method for processing account information in a block chain is provided. A computer device receives identity information and a transfer request, the transfer request requesting to transfer a resource in an account to a target account, the target account being generated by a certificate center. The computer device obtains owner information of the account from the certificate center according to the transfer request. The computer device compares the identity information and the owner information. The computer device transmits an authentication request to the block chain in response to determining that the identity information and the owner information are consistent, the authentication
(Continued)

request requesting the block chain to transfer the resource in the account to the target account.

20 Claims, 5 Drawing Sheets

Related U.S. Application Data continuation of application No. PCT/CN2018/077412, filed on Feb. 27, 2018.

(51) Int. Cl.
*H04L 9/30* (2006.01)
*H04L 9/00* (2022.01)

(56) References Cited

U.S. PATENT DOCUMENTS

| | | | | |
|---|---|---|---|---|
| 10,158,480 | B1* | 12/2018 | Winklevoss | H04L 9/3247 |
| 10,296,764 | B1* | 5/2019 | Batishchev | G06F 21/602 |
| 10,375,177 | B1 | 8/2019 | Bretan | |
| 10,579,974 | B1* | 3/2020 | Reed | G06Q 20/065 |
| 10,740,732 | B2* | 8/2020 | Thomas | G06Q 20/027 |
| 10,970,684 | B1* | 4/2021 | Kurani | G06Q 20/227 |
| 11,164,165 | B1* | 11/2021 | Andreev | G06Q 20/0655 |
| 11,282,139 | B1* | 3/2022 | Winklevoss | G06Q 40/04 |
| 2005/0251691 | A1* | 11/2005 | Haufe | H04L 9/0861 |
| | | | | 713/189 |
| 2007/0074027 | A1* | 3/2007 | Tung | H04L 9/3247 |
| | | | | 713/176 |
| 2007/0208869 | A1 | 9/2007 | Adelman et al. | |
| 2009/0086977 | A1* | 4/2009 | Berggren | H04L 9/0819 |
| | | | | 380/279 |
| 2014/0157435 | A1 | 6/2014 | Stamos et al. | |
| 2015/0186632 | A1 | 7/2015 | Liu et al. | |
| 2015/0244690 | A1 | 8/2015 | Mossbarger | |
| 2016/0203572 | A1 | 7/2016 | McConaghy et al. | |
| 2016/0267605 | A1 | 9/2016 | Lingham et al. | |
| 2016/0300234 | A1 | 10/2016 | Moss-Pultz et al. | |
| 2016/0359633 | A1* | 12/2016 | Norton | H04L 9/30 |
| 2017/0046806 | A1* | 2/2017 | Haldenby | G06Q 40/128 |
| 2017/0048234 | A1* | 2/2017 | Lohe | H04L 63/061 |
| 2017/0111175 | A1 | 4/2017 | Oberhauser et al. | |
| 2017/0147808 | A1* | 5/2017 | Kravitz | H04L 9/3213 |
| 2017/0214699 | A1 | 7/2017 | Johnsrud | |
| 2017/0330179 | A1* | 11/2017 | Song | G06Q 20/3829 |
| 2017/0344983 | A1* | 11/2017 | Muftic | G06Q 20/065 |
| 2018/0060496 | A1 | 3/2018 | Bulleit et al. | |

FOREIGN PATENT DOCUMENTS

| | | |
|---|---|---|
| CN | 107066893 A | 8/2017 |
| JP | 101567780 A | 10/2009 |
| WO | 2016/118359 A1 | 7/2016 |

OTHER PUBLICATIONS

International Search Report for PCT/CN2018/077412, dated May 24, 2018.
Written Opinion of PCT/CN2018/077412, dated May 24, 2018 [PCT/ISA/237].

* cited by examiner

| Lost account information | Target account information | Identification & transfer request | Resource transfer list | Signature |

METHOD AND APPARATUS FOR PROCESSING ACCOUNT INFORMATION IN BLOCK CHAIN, STORAGE MEDIUM, AND ELECTRONIC APPARATUS

CROSS-REFERENCE TO RELATED APPLICATION(S)

This application is a continuation of U.S. application Ser. No. 16/371,480, filed Apr. 1, 2019, which is a bypass continuation of International Application No. PCT/CN2018/077412, filed on Feb. 27, 2018, in the Chinese Patent Office, which claims priority to Chinese Patent Application No. 201710120699.9, entitled "METHOD AND APPARATUS FOR PROCESSING ACCOUNT INFORMATION IN BLOCK CHAIN, STORAGE MEDIUM, AND ELECTRONIC APPARATUS", filed on Feb. 28, 2017, in the Chinese Patent Office, the disclosures of which are incorporated in their entireties by reference.

BACKGROUND

1. Field

Exemplary embodiments relate to the field of block chains, and specifically, to a method and an apparatus for processing account information in a block chain, a storage medium, and an electronic apparatus.

2. Description of the Related Art

An account in a block chain usually consists of a public key and a private key (asymmetric keys). An address of an account is usually obtained by hashing the public key, and the private key is used for proving and authorizing transactions of resources in the account. A user proves an identity of the user and trades the resources in the account, by using the private key of the account. Once the private key is lost, the resources in the account cannot be transferred or traded.

To avoid that the resources in the account cannot be transferred or traded when the private key is lost, the following two solutions are usually used in the related art technology:

Solution 1: An intermediary is used as a trustee of a private key of the user.

Solution 2: An account right is entrusted to a third party, and when the private key of the account is lost, the third party trades or transfers the resources on behalf of the user. For example, trusteeship is established by using a smart contract technology or a similar technology.

However, in the foregoing solutions, trusteeship must be established before the private key is lost. If the user does not establish trusteeship before the account is lost, the above solutions are invalid. In addition, when the private key or the right is entrusted to the third party, security of the resources cannot be completely guaranteed. If the resources are lost, it may not be proven that the loss of the resources is caused by the user or a trustee, and consequently, the account is insecure.

For the foregoing problems, currently, no effective solution is proposed.

SUMMARY

One or more exemplary embodiments provide a method and an apparatus for processing account information in a block chain, a storage medium, and an electronic apparatus, to solve a technical problem of account insecurity caused by loss of a private key of an account in a block chain.

According to an aspect of an exemplary embodiment, provided is a method for processing account information in a block chain. A computer device receives identity information and a transfer request, the transfer request requesting to transfer a resource in an account to a target account, the target account being generated by a certificate center. The computer device obtains owner information of the account from the certificate center according to the transfer request. The computer device compares the identity information and the owner information. The computer device transmits an authentication request to the block chain in response to determining that the identity information and the owner information are consistent, the authentication request requesting the block chain to transfer the resource in the account to the target account.

According to an aspect of another exemplary embodiment, provided is an apparatus for processing account information in a block chain, the apparatus including: at least one memory operable to store program code; and at least one processor operable to read the program code and operate as instructed by the program code, the program code including: first receiving code configured to cause the at least one processor to receive identity information and a transfer request requesting to transfer a resource in an account to a target account, the target account being generated by a certificate center; obtaining code configured to cause the at least one processor to obtain owner information of the account from the certificate center according to the transfer request; first comparison code configured to cause the at least one processor to compare the identity information and the owner information; and first transmission code configured to cause the at least one processor to transmit an authentication request to the block chain in response to determining that the identity information and the owner information are consistent, the authentication request requesting the block chain to transfer the resource in the account to the target account.

According to an aspect of still another exemplary embodiment, provided is a non-transitory computer readable storage medium, storing a computer program executable by at least one processor to cause the at least one processor to perform: receiving identity information and a transfer request, the transfer request requesting to transfer a resource in an account to a target account, the target account being generated by a certificate center; obtaining owner information of the account from the certificate center according to the transfer request; comparing the identity information and the owner information; and transmitting an authentication request to a block chain in response to determining that the identity information and the owner information are consistent, the authentication request requesting the block chain to transfer the resource in the account to the target account.

In the embodiments of this application, the transfer request and the identity information that are sent by the user are received, the transfer request being used for requesting to transfer the resource in the lost account to the target account, and the target account being generated by the certificate center; the owner information of the lost account is obtained from the certificate center according to the transfer request; the identity information and the owner information are compared; the authentication request is submitted to the block chain when it is determined through comparison that the identity information and the owner information are consistent, so that the block chain records the transfer event in the block chain according to the authentication request, the transfer event being used for instructing to transfer the resource in the lost account to the target account. The identity information provided by the user and the owner information of the lost account are compared to determine whether the identity information provided by the user and the owner information of the lost account are consistent, and when it is determined through comparison that the identity information provided by the user and the owner information of the lost account are consistent, the authentication request is submitted to the block chain, to transfer the resource in the lost account to the target account in the block chain, to achieve the technical effect that a signature of a private key of the lost account does not need to be verified when the resource in the lost account is transferred to the target account, thereby solving a technical problem of account insecurity caused by loss of the private key of the account in the block chain.

BRIEF DESCRIPTION OF THE DRAWINGS

The accompanying drawings described herein are used for providing further understanding of exemplary embodiments and constitute a part of the disclosure. Exemplary embodiments and descriptions thereof are used for explaining the disclosure and do not constitute an improper limitation to the disclosure.

DETAILED DESCRIPTION

To help a person skilled in the art better understand solutions according to the disclosure, the following clearly and completely describes the technical solutions in the embodiments with reference to the accompanying drawings. Apparently, the described embodiments are merely some rather than all of the embodiments. All other embodiments that can be obtained by persons skilled in the art based on the exemplary embodiments described herein without creative efforts shall fall within the protection scope of the disclosure.

It should be noted that in the specification, claims, and accompanying drawings, the terms "first", "second", and so on are intended to distinguish between similar objects rather than indicating a specific order. It should be understood that data used in this way can be interchanged in an appropriate case, so that the embodiments that are described herein can be implemented in a sequence other than those sequences illustrated or described herein. Moreover, the terms "include", "contain" and any other variants mean to cover the non-exclusive inclusion. For example, a process, method, system, product, or device that includes a series of operations or units is not necessarily limited to those operations or units that are expressly listed, but may include other operations or units not expressly listed or inherent to such a process, method, product, or device.

The meaning of the terms described herein is explained below.

Figure 1:
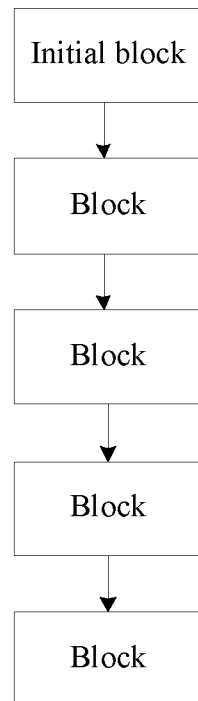
FIG. 1 is a schematic diagram of a block chain according to the related art technology.

Block chain: As shown in FIG. 1, a block chain organizes data in a unit of a block. All transaction records in the whole network may be stored in the block chain in a form of transaction orders. A first block in the block chain is an initial block, also referred to as a genesis block. One transaction formed each time is recorded in one block, and information recorded in the block is transparent to the whole network. A plurality of blocks is connected together in a sequence to form the block chain.

Account: An account in a block chain usually consists of a public key and a private key (asymmetric keys). An address of the account is usually obtained by hashing the public key, and the private key is used for proving and authorizing transactions of an asset in the account. Once the private key is lost, a conventional transaction usually cannot be performed. An account concept in this text is similar to a Bitcoin address concept of Bitcoin. A lost account and a target account in this text are both accounts in the block chain.

Certificate center: A certificate center is used for creating a block chain account, and records a public key and an address of the account and identity information of an owner of the account.

Private key loss: In this text, "private key loss" and "account loss" may be understood as synonyms. "An old account" is a lost account.

Special transaction: When a user loses a private key, a transaction in which an asset in a lost account is transferred to a new account through a super account is referred to as a special transaction.

First account: A first account is a super account in a block chain. The super account may be an account that is accepted in a block chain network and that cannot be forged. The first account may be used for a special transaction, or may be used for other purposes, for example, used for creating assets in a block chain. A public key of the first account is recorded in a certificate center and an initial block of the block chain.

Gateway: A gateway is an asset gateway. The asset gateway is a user with special rights in a block chain, and a super account is an account of the asset gateway. The asset gateway can send an asset issuing request, an asset retrieving request, and the like to a block chain service in the block chain. The gateway may be another system, for example, may be an electronic counter system, responsible for processing user and service requests and then sending these requests to a block chain through a block chain interface (through a super account). The gateway represents an asset gateway mechanism, is an owner of a first account (a super account), and is usually an authority in a block chain network. In this text, the gateway is responsible for handling a request for a user to retrieve a resource. The gateway may be disposed in a terminal or a server, and the terminal or the server implements functions of the gateway.

According to an embodiment, a method for processing account information in a block chain is provided.

Figure 2:
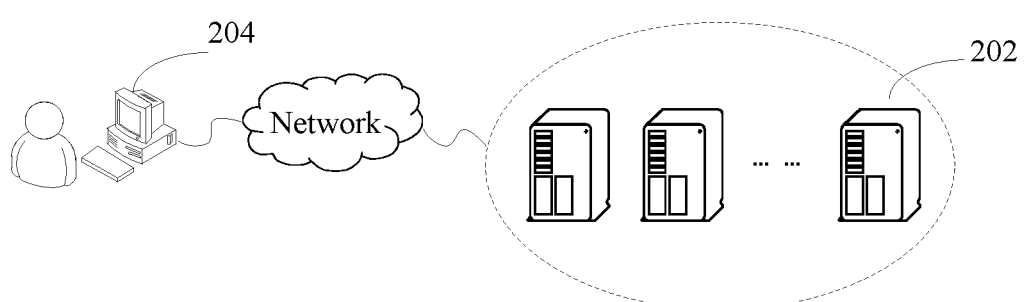
FIG. 2 is a schematic diagram of a hardware environment of a method for processing account information in a block chain according to an embodiment.

Optionally, in this embodiment, the method for processing account information in a block chain may be applied to a hardware environment that is composed of a server 202 and a terminal 204 and that is shown in FIG. 2. As shown in FIG.

2, the server 202 is connected to the terminal 204 through a network. The network includes but is not limited to: a wide area network, a metropolitan area network, or a local area network, and the terminal 204 is not limited to a PC, a mobile phone, a tablet computer, or the like. The method for processing account information in a block chain in this embodiment may be performed by the server 202, or may be performed by the terminal 204, or may be performed by the server 202 and the terminal 204 together. The terminal 204 performs the method for processing account information in a block chain in this embodiment, and alternatively, the method may be performed by a client installed on the terminal 204.

The hardware environment that is composed of the server 202 and the terminal 204 and that is shown in FIG. 2 is mainly used for performing the method for processing account information in a block chain in this embodiment. The block chain in the method for processing account information in a block chain may be disposed in a server different from that in the hardware environment shown in FIG. 2. That is, the hardware environment composed of the server 202 and the terminal 204 in this embodiment is used for implementing an environment of a gateway, and the hardware environment and the block chain may be two different systems. Optionally, the server 202 shown in FIG. 2 may be a server cluster. Some servers in the server cluster may be used for implementing functions of the gateway, and some other servers may implement functions of the block chain. Alternatively, functions of both the gateway and the block chain may be implemented on one server.

It should be noted that a device in the block chain in this embodiment may be construed as a computer device, such as a terminal or a server. The device in the block chain may be used as a node of the block chain, nodes of a plurality of block chains form the block chain, and at least one device corresponding to the plurality of nodes implements the functions of the block chain. Method operations or processes performed by the block chain are performed by the nodes in the block chain.

Figures 3, 4:
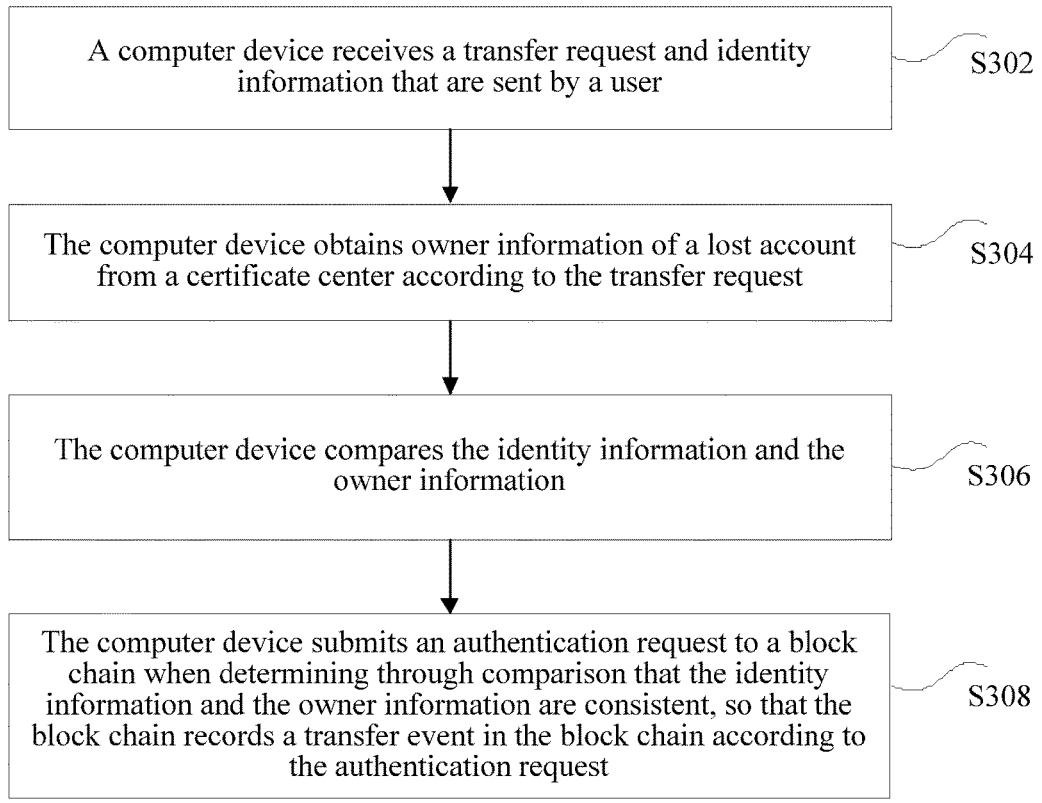
FIG. 3 is a flowchart of an optional method for processing account information in a block chain according to an embodiment.
FIG. 4 is a schematic diagram of a filed list of first data according to an embodiment.

FIG. 3 is a flowchart of an optional method for processing account information in a block chain according to an embodiment. The processing method is performed by a computer device. The computer device includes a terminal and a server. The computer device can implement functions of a gateway, and the gateway is configured to perform the method for processing account information in a block chain. As shown in FIG. 3, the method may include the following operations.

Operation S302: A computer device receives a transfer request and identity information that are sent by a user, the transfer request being used for requesting to transfer a resource in a lost account to a target account, and the target account being generated by a certificate center.

Operation S304: The computer device obtains owner information of the lost account from the certificate center according to the transfer request.

Operation S306: The computer device compares the identity information and the owner information.

Operation S308: The computer device submits an authentication request to a block chain requesting the block chain to transfer the resource in the lost account to the target account when determining through comparison that the identity information and the owner information are consistent (e.g., the identity information and the owner information are the same). Accordingly, the block chain records a transfer event in the block chain according to the authentication request, the transfer event being used for instructing to transfer the resource in the lost account to the target account.

According to operation S302 to operation S308, the identity information provided by the user and the owner information of the lost account are compared to determine whether the identity information provided by the user and the owner information of the lost account are consistent, and when it is determined through comparison that the identity information provided by the user and the owner information of the lost account are consistent, the authentication request is submitted to the block chain, to transfer the resource in the lost account to the target account in the block chain, thereby solving a technical problem of account insecurity caused by loss of the private key of the account in the block chain, so that a signature of a private key of the lost account does not need to be verified when the resource in the lost account is transferred to the target account, to achieve the technical effect of improving account security.

In the technical solution provided in operation S302, when the private key in a block chain account is lost, the user may send the identity information and the transfer request to the gateway, to transfer the resource in the lost account to the target account. Specifically, when the private key of the account is lost, the user first generates a new account through the certificate center and uses the newly generated account as the target account. Optionally, the certificate center is used for creating an account and public keys and addresses of all accounts and information about owners of the accounts are recorded in the certificate center. The user sends a transfer request to the gateway according to a lost account and the target account. The transfer request is used for requesting the gateway to transfer a resource in the lost account to the target account. In addition, the user further needs to provide the identity information to the gateway, to prove, through the identity information, that the user is an owner of the lost account. The gateway may be but not be limited to a server or an electronic platform or a counter service set by an authority in a block chain network. The gateway is configured to represent the authority to receive the transfer request and the identity information that are submitted by the user. Depending on specific stipulations, the identity information submitted by the user may be paper materials of an identity document of the user or scanning copies of the paper materials or may be files that can prove a user identity and a will of the user and that are in other formats, such as a human face image and pupil scanning information.

In the technical solution provided in operation S304, the gateway has a right of obtaining account information recorded in the certificate center from the certificate center. To verify the identity information submitted by the user, the gateway obtains information about the owner of the lost account from the certificate center according to the transfer request submitted by the user, and the information about the owner of the lost account is identity information of the owner of the lost account. For example, the certificate center records an identity card number of the owner of the lost account or a scanning copy of an identity card copy, and then the user needs to provide corresponding materials that prove identity, such as the identity card copy. Alternatively, the certificate center records voiceprint information of the owner of the lost account, and then the user needs to provide corresponding voiceprint materials.

In the technical solution provided in operation S306, the gateway compares the identity information submitted by the user with the information about the owner of the lost account that is obtained from the certificate center, to determine whether the identity information submitted by the user and the owner information of the lost account are consistent, to verify whether the user is the owner of the lost account.

In the technical solution provided in operation S308, if it is determined through verification that the identity information submitted by the user and the information about the owner of the lost account are inconsistent, verification of the identity information of the user fails, that is, the user is determined as not being the owner of the lost account, the transfer request submitted by the user to the gateway is illegal, and the gateway makes no response to the transfer request. If the identity information submitted by the user and the owner information of the lost account are consistent, verification on the identity information of the user succeeds, that is, the user is determined as the owner of the lost account, and the gateway makes a response to the transfer request submitted by the user. Specifically, the gateway submits the authentication request to the block chain according to the transfer request submitted by the user, so that the block chain records a transfer event, to instruct to transfer the resource in the lost account to the target account. For example, a block is newly added to the block chain, and is used for recording the transfer event, to complete transferring the resource in the lost account to the target account.

The method for processing account information in a block chain provided in this embodiment may be applied to digital payment scenarios in various block chain modes, for example, account transactions of banks, portfolios, gold exchange in block chain modes or may be applied to transaction scenarios of virtual resources in block chain modes, for example, transactions of virtual resources of game accounts in online games.

Optionally, the submitting, by the gateway, an authentication request to a block chain includes: signing initial data by using a private key of a first account, to obtain first data, the initial data including information about the lost account, information about the target account, the identity information, the transfer request, and a resource list, and the resource list being a list of all resources to be transferred in the lost account; generating the authentication request according to the first data; and submitting the authentication request carrying the initial data to the block chain.

In an optional embodiment, when submitting the authentication request to the block chain, the gateway first obtains the initial data according to the received transfer request and then signs the initial data to obtain first data. As shown in FIG. 4, optionally, the authentication request includes the initial data and a signature provided by the gateway for the initial data. The initial data includes the information about the lost account, information about the target account, the identity information and the transfer request that are submitted by the user, and a list of all resources that need to be transferred from the lost account to the target account. The gateway generates the authentication request according to the first data and the initial data and submits the authentication request to the block chain.

The first account exists in the block chain. Optionally, the first account may be a super account in the block chain. The first account may be an account that is unique and that cannot be forged in the block chain, and the gateway is an owner of the first account and has a private key of the first account. The gateway may sign the initial data by using the private key of the first account to obtain the first data. The authentication request submitted by the gateway to the block chain is generated according to the first data, and the first data is obtained by signing the initial data by using the private key of the first account. The gateway serves as the owner of the first account and owns the private key of the first account and needs to take responsibility for authenticity of the authentication request, namely, information in the initial data. Therefore, the block chain only needs to verify whether it is legal for the gateway to sign the initial data by using the private key, and when it is legal, confirms that authentication succeeds and records the transfer event.

Optionally, the signing, by the computer device, initial data by using a private key of a first account, to obtain first data includes: encrypting, by the computer device, the identity information and the transfer request by using a public key of the first account, to obtain second data; and signing, by the computer device, the information about the lost account, the information about the target account, the resource list, and the second data by using the private key of the first account, to obtain the first data.

In an optional embodiment, to protect privacy of the user and prevent personal data of the user from being leaked, the identity information and the transfer request that are submitted by the user may be encrypted. Specifically, when signing the initial data by using the private key of the first account to obtain the first data, the gateway first obtains the public key of the first account from the certificate center; encrypts, by using the public key of the first account, the identity information and the transfer request that are submitted by the user, to obtain the second data; and then signs the information about the lost account, the information about the target information, the resource list, and the second data by using the private key of the first account, to obtain the first data. After the gateway generates the authentication request according to the first data and submits the authentication request to the block chain, because the identity information and the transfer request that are submitted by the user are encrypted by the public key of the first account, another person can obtain only the encrypted identity information and transfer request of the user from the block chain but cannot obtain original texts of the identity information and the transfer request of the user.

In addition to the foregoing embodiments, the disclosure further provides an optional embodiment. In the optional embodiment, the signing, by the computer device, initial data by using a private key of a first account, to obtain first data includes: signing, by the computer device, the identity information and the transfer request by using the private key of the first account, to obtain third data; and signing, by the computer device, the information about the lost account, the information about the target account, the resource list, and the third data by using the private key of the first account, to obtain the first data.

When signing the initial data by using the private key of the first account to obtain the first data, the gateway first signs, by using the private key of the first account, the identity information and the transfer request that are submitted by the user, to obtain the third data, and then signs the information about the lost account, the information about the target account, the resource list, and the third data by using the private key of the first account, to obtain the first data. A process in which the gateway signs, by using the private key of the first account, the identity information and the transfer request that are submitted by the user includes first hashing the identity information and the transfer request that are submitted by the user and then encrypting the identity information and the transfer request, to obtain the third data, and a process of the hashing is irreversible. Therefore, after the gateway generates the authentication request according to the first data and submits the authentication request to the block chain, even if another person can decrypt the identity information and the transfer request, the hashed identity information and transfer request are obtained, and original texts of the identity information and the transfer request of the user cannot be obtained, to prevent privacy of the user from being leaked.

Optionally, the submitting an authentication request to a block chain when determining through comparison that the identity information and the owner information are consistent, so that the block chain records a transfer event in the block chain according to the authentication request includes: obtaining, by a device of the block chain, the first data according to the authentication request; verifying, by the device of the block chain, the first data; and recording, by the device of the block chain, the transfer event according to the initial data after the verification succeeds.

In an optional embodiment, in a process in which the gateway submits the authentication request to the block chain, so that the block chain records the transfer event according to the authentication request, the block chain obtains the first data from the authentication request submitted by the gateway and verifies the first data. After verification succeeds, the block chain trusts the initial data carried in the authentication request and records the transfer event according to the initial data in the authentication request.

When verifying the first data, the block chain only needs to obtain the public key of the first account from the certificate center and verify the first data by using the public key of the first account. If verification succeeds, the block chain trusts the authentication request, obtains the initial data carried in the authentication request, and records the transfer event according to the initial data. As shown in FIG. 4, in a process in which the block chain authenticates the first data, the block chain merely verifies a signature in a fifth column in FIG. 4 and does not need to verify initial data in the first four columns. The signature in the fifth column is a signature provided by the gateway for the initial data in the first four columns by using the private key of the first account. When verification performed by a block on the signature in the fifth column succeeds, the initial data in the first four columns is selected to be trusted. Authenticity of the initial data in the first four columns is verified by the gateway, that is, the gateway takes responsibility for verifying the initial data.

In the foregoing verification process, because checking of the identity information and the transfer request is completed by the gateway, and the block chain trusts a checking result of the gateway, the block chain only needs to verify whether a signature provided by the gateway for the initial data is authentic and does not need to verify the identity information and the transfer request of the user. Provided that the block chain determines through verification that the signature provided by the gateway for the initial data is authentic, the received authentication request is accepted, and the transfer event is recorded, to transfer the resource in the lost account to the target account.

Optionally, the verifying, by the device of the block chain, the first data includes: obtaining, by a plurality of devices of the block chain, the public key of the first account from the certificate center or an initial block of the block chain; and verifying, by the plurality of devices of the block chain, the first data by using the public key of the first account.

In an optional embodiment, the block chain may include a plurality of devices. It should be noted that the block chain in this embodiment includes a plurality of block nodes, and the plurality of devices included in the block chain corresponds to a plurality of block nodes, namely, one block node may correspond to one device. In a process in which the block chain verifies the first data, each device in a plurality of blocks in the block chain obtains the public key of the first account from the certificate center or the initial block of the block chain and verifies the first data by using the public key of the first account. If verification on most of the plurality of devices succeeds, verification performed by the block chain on the first data succeeds, and the block selects to trust the initial data of the first data. In a process in which each device verifies the first data, the device only needs to verify whether the signature provided by the gateway for the initial data is authentic and does not need to verify the identity information and the transfer request that are submitted by the user in the initial data. The gateway takes responsibility for verifying authenticity of the identity information and the transfer request that are submitted by the user.

Optionally, after the submitting an authentication request to a block chain, so that the block chain records a transfer event in the block chain according to the authentication request, the method for processing account information in a block chain may further include: setting, by a device of the block chain, a freezing period for the target account, the resource in the target account not being allowed to be transferred within the freezing period.

In an optional embodiment, to avoid loss to the lost account caused by incorrectly transferring the resource in the lost account to the target account, after recording the transfer event according to the authentication request submitted by the gateway, the block chain sets a freezing period for the target account, and within the freezing period, the resource in the target account cannot be transferred. If within the freezing period set by the block chain for the target account, the owner of the lost account raises an objection, for example, the owner of the lost account actually does not initiate the transfer request, or an error occurs in a process of transferring the resource in the lost account, or the owner of the lost account believes that the gateway or another person commits a fraud, the block chain may return the resource transferred by the lost account to the target account to the lost account, to protect equity of the owner of the lost account. Specifically, a process of returning the resource in the target account to the lost account is the same as a process of transferring the resource in the lost account to the target account. The owner of the lost account provides the identity information and a resource returning request to the gateway. The gateway verifies the identity information and the resource returning request, and submits the authentication request to the block chain according to the identity information of the user and the resource returning request after the verification succeeds. The block chain records the transfer event according to the authentication request, to return the resource in the target account to the lost account.

Optionally, after the submitting, by the computer device, an authentication request to a block chain, so that the block chain records a transfer event in the block chain according to the authentication request, the method for processing account information in a block chain may further include: extracting, by the computer device, the initial data from the block chain, the initial data including the second data obtained by the gateway by encrypting the identity information and the transfer request by using the public key of the first account; decrypting, by the computer device, the second data by using the private key of the first account, to obtain first decrypted data; comparing, by the computer device, the first decrypted data and data locally stored by the gateway to determine whether the first decrypted data and the data locally stored by the gateway are consistent; and if determining through comparison that the first decrypted data and the locally stored data are inconsistent, determining, by the computer device, that the locally stored data has been tampered.

In an optional embodiment, to prevent the initial data sent by the user to the gateway from being tampered in a process of being submitted to the block chain, the initial data recorded on the block chain may also be verified. For example, after the resource in the lost account is transferred to the target account, when the owner of the lost account proposes that the gateway or another person commits a fraud and demands returning the transferred resource, or the freezing period of the target account already ends, the resource transferred to the target account is already transferred again so as not to be returned to the lost account, and the owner of the lost account needs to be compensated through judicatory means, the gateway needs to provide the locally stored identity information and transfer request as evidence and may certify through verification that the identity information and the transfer request that are provided by the gateway are the identity information and the transfer request that are submitted by the gateway to the block chain and that are not tampered. Specifically, if the identity information and transfer data that are included in the authentication request submitted by the gateway to the block chain are encrypted by using the public key of the first account, the gateway extracts the initial data from the block chain. The initial data includes the second data obtained by encrypting, by the gateway by using the public key of the first account, the identity information and the transfer request that are submitted by the user. The gateway decrypts the second data by using the private key of the first account to obtain original texts of the identity information and the transfer request that are submitted by the user, that is, the first decrypted data. The gateway compares the first decrypted data and the data locally stored by the gateway. If the first decrypted data and the data locally stored by the gateway are consistent, the data locally stored by the gateway is not tampered. If the first decrypted data and the data locally stored by the gateway are inconsistent, the data locally stored by the gateway has been tampered.

Optionally, after the submitting, by the computer device, an authentication request to a block chain, so that the block chain records a transfer event in the block chain according to the authentication request, the method for processing account information in a block chain may further include: extracting, by the computer device, the initial data from the block chain, the initial data including the third data obtained by signing the identity information and the transfer request by using the private key of the first account; decrypting, by the computer device, the third data by using the public key of the first account, to obtain second decrypted data; hashing, by the computer device, locally stored data, to obtain hashed data; comparing, by the computer device, the second decrypted data and the hashed data to determine whether the second decrypted data and the hashed data are consistent; and determining, by the computer device, that the locally stored data has been tampered if determining through comparison that the second decrypted data and the hashed data are inconsistent.

In an optional embodiment, when it is verified whether the identity information and the transfer request that are submitted by the gateway are consistent with the identity information and the transfer request that are submitted by the gateway to the block chain, if the identity information and the transfer request that are included in the authentication request submitted by the gateway to the block chain are signed by using the private key of the first account, the gateway extracts the initial data from the block chain. The initial data includes the third data obtained by signing, by the gateway by using the private key of the first account, the identity information and the transfer request that are submitted by the user. The gateway encrypts the third data by using the public key of the first account to obtain the second decrypted data. The data is obtained after hashing the identity information and the transfer request. The gateway hashes the locally stored identity information and transfer request, to obtain hashed data and compares the second decrypted data and the hashed data. If the second decrypted data and the hashed data are consistent, the data locally stored by the gateway is consistent with the data recorded on the block chain, and the data locally stored by the gateway is not tampered. If the second decrypted data and the hashed data are inconsistent, the data locally stored by the gateway is inconsistent with the data recorded on the block chain, and the data locally stored by the gateway has been tampered.

Optionally, after the submitting an authentication request to a block chain, so that the block chain records a transfer event in the block chain according to the authentication request, the method for processing account information in a block chain may further include: extracting, by the computer device, the initial data from the block chain according to a check instruction sent by the user, the initial data including the second data obtained by encrypting the identity information and the transfer request by using the public key of the first account, and the check instruction being used for instructing to check the second data; encrypting, by the computer device by using the public key of the first account, the transfer request and the identity information that are sent by the user, to obtain fourth data; and comparing, by the computer device, the second data and the fourth data to determine whether the second data and the fourth data are consistent; determining, if the comparison result is 'yes' (that is, the second data and the fourth data are consistent), that the transfer request and the identity information that are sent by the user have not been tampered, and determining, if the comparison result is 'no' (that is, the second data and the fourth data are not consistent), that the transfer request and the identity information that are sent by the user have been tampered.

Optionally, after the submitting an authentication request to a block chain, so that the block chain records a transfer event in the block chain according to the authentication request, the method for processing account information in a block chain may further include: extracting, by the computer device, the initial data from the block chain according to a check instruction sent by the user, the initial data including the third data obtained by signing the identity information and the transfer request by using the private key of the first account, and the check instruction being used for instructing to check the third data; hashing, by the computer device, the transfer request and the identity information that are sent by the user, to obtain fifth data; decrypting, by the computer device, the third data by using the public key of the first account, to obtain third decrypted data; and comparing, by the computer device, the fifth data and the third decrypted data to determine whether the fifth data and the third decrypted data are consistent; determining, if the comparison result is yes, that the transfer request and the identity information that are sent by the user have not been tampered, and determining, if the comparison result is no, that the transfer request and the identity information that are sent by the user have been tampered.

In an optional embodiment, the user may check, through a client, the identity information and the transfer request that are recorded on the block chain, to ensure that initial information recorded on the block chain is authentic and is not tampered. Optionally, the computer device for checking may be a check client issued by the gateway, and the client may imitate the gateway to encrypt or sign the identity information of the user and the transfer request of the user and obtain the encrypted or signed data. Specifically, after the block chain already records the transfer event according to the authentication request submitted by the gateway, the user sends the check instruction to the client. The check instruction includes original texts of the identity information and the transfer request that are submitted by the user to the gateway. After receiving the check instruction of the user, the client obtains the identity information and the transfer request of the user according to the check instruction, then extracts the identity information and the transfer request of the user that are recorded on the block chain, and certifies through verification whether the identity information and the transfer request of the user are consistent with the identity information and the transfer request of the user that are recorded on the block chain. Specifically, if the identity information and the transfer data that are included in the authentication request submitted by the gateway to the block chain are encrypted, that is, the second data obtained by encrypting the identity information and the transfer data by using the public key of the first account, the client encrypts the identity information and the transfer request of the user by using the public key of the first account, to obtain the fourth data, and then compares the fourth data and the identity information and the transfer request of the user that are recorded on the block chain, to obtain a comparison result indicating whether the fourth data and the identity information and the transfer request of the user are consistent. If the comparison result is yes, it indicates that the initial data recorded on the block chain is initial data actually submitted by the user to the gateway. If the comparison result is no, it indicates that the initial data recorded on the block chain and the initial data actually submitted by the user to the gateway are inconsistent, and the user needs to appeal to the gateway. If the identity information and the transfer data that are included in the authentication request submitted by the gateway to the block chain are signed, that is, the third data obtained by signing the identity information and the transfer data by using the private key of the first account, the client decrypts the third data by using the public key of the first account to obtain the third decrypted data, and hashes the identity information and the transfer request of the user to obtain the fifth data, and then compares the fifth data and the third decrypted data, to obtain a comparison result indicating whether the fifth data and the third decrypted data are consistent. If the comparison result is yes, it indicates that the initial data recorded on the block chain is the initial data actually submitted by the user to the gateway. If the comparison result is no, it indicates that the initial data recorded on the block chain and the initial data actually submitted by the user to the gateway are inconsistent, and the user may appeal to the gateway.

Optionally, cases in which the user needs to appeal to the gateway or sue the gateway to require the gateway to provide evidence may include, for example but not limited to, the following several cases: in a first case, the transfer request received by the gateway is an incorrect or false request initiated by another user; the gateway causes by negligence in a verification progress such that the block chain records the transfer event according to the incorrect or false request. When the transfer event according to the incorrect or false request is discovered by the user, the target account is still in the freezing period; after the gateway re-checks the materials, the transferred resource may be returned to the original account, that is, the lost account in the transfer request, of the resource according to the returning request of the user. In a second case, when the transfer event according to the incorrect or false request is discovered by the user, the freezing period of the target account has been expired, the transferred resource cannot be returned, then the user may sue the gateway to an arbitration institution, and the arbitration institution requires the gateway to provide the received user identity information and transfer request and use the received user identity information and transfer request as evidence. If the evidence can prove that the gateway causes loss to the user by mistake, the gateway takes responsibility and compensates the user. It should be noted that the evidence provided by the gateway to the arbitration institution cannot be tampered. If the evidence has been tampered by the gateway, the arbitration institution re-encrypts or re-signs the evidence and compares the evidence with the initial data recorded on the block chain, leading to a comparison result "inconsistent". In a third case, the gateway commits a fraud and forges an authentic user identity and transfer request as false initial data. After the fraud is discovered by the user, the user may sue the gateway to the arbitration institution. The gateway has to provide the false initial data forged by the gateway to the arbitration institution as evidence. Otherwise, after the evidence provided by the gateway is encrypted or signed, the evidence is inconsistent with the initial data recorded on the block chain.

The foregoing method embodiment provides a method for transferring the resource in the lost account to the target account in the block chain when the account private key of the user is lost, and after the resource is transferred, when a dispute or a fraud behavior occurs, complete evidence that cannot be tampered can be provided to retrieve the resource or identify responsibility, to ensure benefits of parties in the block chain.

Figure 5:
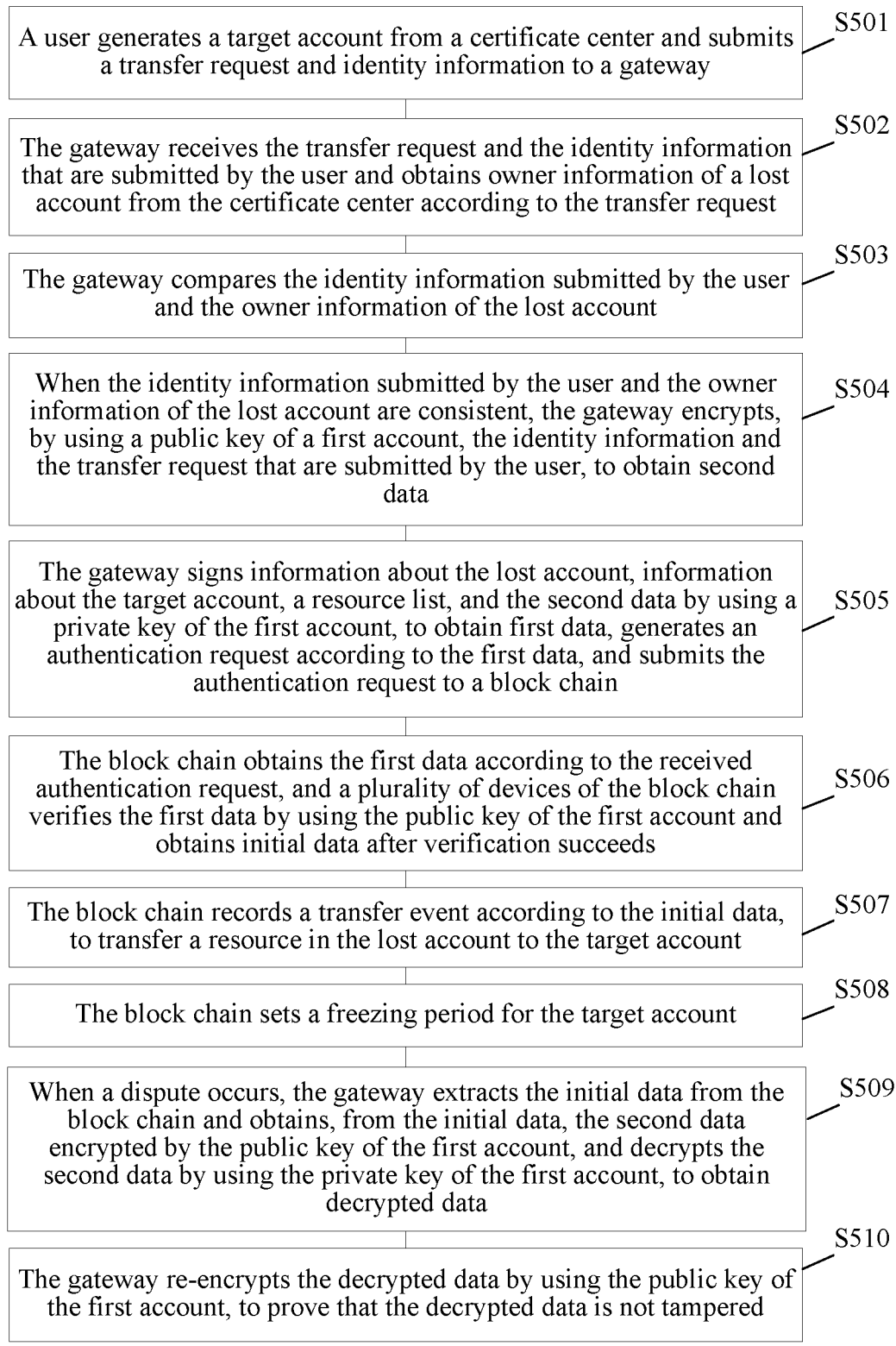
FIG. 5 is a flowchart of an optional method for processing account information in a block chain according to an embodiment.

FIG. 5 is a flowchart of an optional method for processing account information in a block chain according to an embodiment. As shown in FIG. 5, the method includes the following operations.

Operation S501: A user generates a target account from a certificate center and submits a transfer request and identity information to a gateway. After losing a private key of an account, the user first generates a new account through the certificate center and uses the newly generated account as the target account. The certificate center is used for creating an account, and public keys and addresses of all accounts and information about owners of the accounts are recorded in the user center. The user sends a transfer request to the gateway according to a lost account and the target account. The transfer request is used for requesting the gateway to transfer a resource in the lost account to the target account. In addition, the user further needs to provide the identity information to the gateway, to prove, through the identity information, that the user is an owner of the lost account.

Operation S502: The gateway receives the transfer request and the identity information that are submitted by the user and obtains owner information of a lost account from the certificate center according to the transfer request. The gateway has a right of obtaining recorded account information from the certificate center. The gateway obtains identity information of the owner of the lost account from the certificate center according to the transfer request submitted by the user, to verify the identity information submitted by the user. For example, the certificate center records an identity card number of the owner of the lost account or a scanning copy of an identity card copy, and then the user needs to provide corresponding materials that prove identity, such as the identity card copy. Alternatively, the certificate center records voiceprint information of the owner of the lost account, and then the user needs to provide corresponding voiceprint materials.

Operation S503: The gateway compares the identity information submitted by the user and the owner information of the lost account. The gateway compares the identity information submitted by the user with information about the owner of the lost account that is obtained from the certificate center, to determine whether the identity information submitted by the user and the owner information of the lost account are consistent, to verify whether the user is the owner of the lost account.

Operation S504: When the identity information submitted by the user and the owner information of the lost account are consistent, the gateway encrypts, by using a public key of a first account, the identity information and the transfer request that are submitted by the user, to obtain second data. To protect privacy of the user and prevent personal data of the user from being leaked, the gateway first obtains the public key of the first account from the certificate center and encrypts, by using the public key of the first account, the identity information and the transfer request that are submitted by the user, to obtain the second data.

Operation S505: The gateway signs information about the lost account, information about the target account, a resource list, and the second data by using a private key of the first account, to obtain first data, generates an authentication request according to the first data, and submits the authentication request to a block chain.

Operation S506: The block chain obtains the first data according to the received authentication request, and a plurality of devices of the block chain verifies the first data by using the public key of the first account and obtains initial data after verification succeeds. The block chain obtains the first data from the authentication request submitted by the gateway, and the plurality of devices of the block chain verifies the first data by using the public key of the first account. If verification succeeds, the block chain may obtain the initial data from the first data. In the foregoing verification process, because checking of the identity information and the transfer request is completed by the gateway, and the block chain trusts a checking result of the gateway, the block chain only needs to verify whether a signature provided by the gateway for the initial data is authentic and does not need to verify the identity information and the transfer request of the user.

Operation S507: The block chain records a transfer event according to the initial data, to transfer a resource in the lost account to the target account. A block may be newly added to the block chain, and is used for recording the transfer event, to complete transferring the resource in the lost account to the target account.

Operation S508: The block chain sets a freezing period for the target account. To avoid loss to the lost account caused by incorrectly transferring the resource in the lost account to the target account, after recording the transfer event according to the authentication request submitted by the gateway, the block chain sets a freezing period for the target account, and within the freezing period, the resource in the target account cannot be transferred. If within the freezing period set by the block chain for the target account, the owner of the lost account raises an objection, for example, the owner of the lost account actually does not initiate the transfer request, or an error occurs in a process of transferring the resource in the lost account, or the owner of the lost account believes that the gateway or another person commits a fraud, the block chain may return the resource transferred by the lost account to the target account to the lost account, to protect equity of the owner of the lost account. Specifically, a process of returning the resource in the target account to the lost account is the same as a process of transferring the resource in the lost account to the target account. The owner of the lost account provides the identity information and a resource returning request to the gateway. The gateway verifies the identity information and the resource returning request, and submits the authentication request to the block chain according to the identity information and the resource returning request of the user after the verification succeeds. The block chain records the transfer event according to the authentication request, to return the resource in the target account to the lost account.

Operation S509: When a dispute occurs, the gateway extracts the initial data from the block chain and obtains, from the initial data, the second data encrypted by the public key of the first account, and decrypts the second data by using the private key of the first account, to obtain decrypted data. The decrypted data may be used as evidence for verdict of the dispute, to adjudicate the dispute that occurs.

Operation S510: The gateway re-encrypts the decrypted data by using the public key of the first account, to prove that the decrypted data is not tampered. To prove that the evidence used for verdict of the dispute is authentic and is not tampered, the gateway may re-encrypt, by using the public key of the first account, the identity information and the transfer request of the user that are used as evidence, and compare the encrypted data with the second data obtained from the block chain. If it is determined through comparison that the encrypted data and the second data obtained from the block chain are inconsistent, it proves that the user information and the transfer request that are used as evidence are tampered and are not authentic. Optionally, the gateway may further obtain, from a database, backup files of original texts of the identity information and the transfer request that are submitted by the user, and the backup files may also be re-encrypted by the gateway by using the public key of the first account and compared with the second data in the block chain, to prove authenticity of the backup files.

It should be noted that for simple descriptions, the foregoing method embodiments are stated as a series of action combinations. However, a person skilled in the art should know that the disclosure is not limited to the sequence of the described actions because according to the disclosure, some operations may use another sequence or may be simultaneously performed. In addition, a person skilled in the art should also know that all the embodiments described in this specification are exemplary embodiments, and the related actions and modules may not necessarily be required in the disclosure.

Based on the foregoing descriptions of the embodiments, a person skilled in the art may clearly understand that the method in the foregoing embodiments may be implemented by software in addition to a necessary universal hardware platform or by hardware only. However, the former may be a preferable form of implementation of the disclosure. Based on such an understanding, the technical solutions essentially or the part contributing to the prior art may be implemented in a form of a software product. The computer software product is stored in a storage medium (such as a ROM/ RAM, a magnetic disk, or an optical disc) and includes several instructions for instructing a terminal device (which may be a mobile phone, a computer, a server, a network device, or the like) to perform the methods described in the embodiments.

Figure 6:
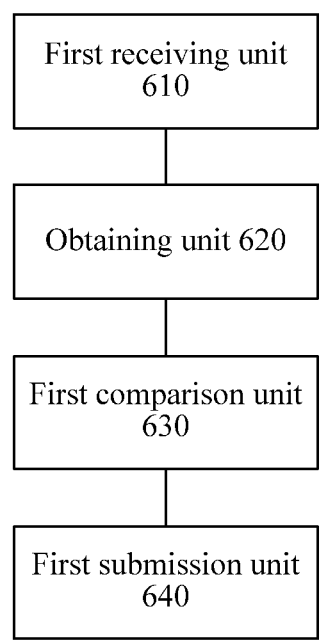
FIG. 6 is a schematic diagram of an optional apparatus for processing account information in a block chain according to an embodiment.

According to an embodiment, an apparatus for processing account information in a block chain and for performing the foregoing method for processing account information in a block chain is further provided. The processing apparatus according to an embodiment may be disposed in a computer device. FIG. 6 is a schematic diagram of an optional apparatus for processing account information in a block chain according to an embodiment. As shown in FIG. 6, the apparatus for processing account information in a block chain may include: a first receiving unit 610, an obtaining unit 620, a first comparison unit 630, and a first submission unit 640.

The first receiving unit 610 is configured to receive a transfer request and identity information that are sent by a user, the transfer request being used for requesting to transfer a resource in a lost account to a target account, and the target account being generated by a certificate center. The obtaining unit 620 is configured to obtain owner information of the lost account from the certificate center according to the transfer request. The first comparison unit 630 is configured to compare the identity information and the owner information. The first submission unit 640 is configured to submit an authentication request to a block chain when determining through comparison that the identity information and the owner information are consistent, so that the block chain records a transfer event in the block chain according to the authentication request, the transfer event being used for instructing to transfer the resource in the lost account to the target account.

It should be noted that the first receiving unit 610 in this embodiment may be configured to perform operation S302 in the foregoing embodiment; the obtaining unit 620 in this embodiment may be configured to perform operation S304 in the foregoing embodiment; the first comparison unit 630 in this embodiment may be configured to perform operation S306 in the foregoing embodiment; the first submission unit 640 in this embodiment may be configured to perform operation S308 in the foregoing embodiment.

It should be noted herein that examples and application scenarios implemented by the foregoing units and corresponding operations are the same but are not limited to the content disclosed in the foregoing embodiments. It should be noted that the foregoing units may be run in the hardware environment shown in FIG. 2 as a part of the apparatus for processing account information in a block chain, and may be implemented through software, or may be implemented through hardware.

Through the foregoing units, a technical problem of account insecurity caused by loss of a private key of an account in a block chain can be solved, to achieve the technical effect of improving account security.

Optionally, the first submission unit includes: a signature module, configured to sign initial data by using a private key of a first account, to obtain first data, the initial data including information about the lost account, information about the target account, the identity information, the transfer request, and a resource list, and the resource list being a list of all resources to be transferred in the lost account; a generation module, configured to generate the authentication request according to the first data; and a submission module, configured to submit the authentication request carrying the initial data to the block chain.

Optionally, the signature module includes: an encryption sub-module, configured to encrypt the identity information and the transfer request by using a public key of the first account, to obtain second data; and a first signature sub-module, configured to sign the information about the lost account, the information about the target account, the resource list, and the second data by using the private key of the first account, to obtain the first data.

The disclosure further provides an optional embodiment of an apparatus for processing account information in a block chain. In the optional embodiment, the signature module includes: a second signature sub-module, configured to sign the identity information and the transfer request by using the private key of the first account, to obtain third data; and a third signature sub-module, configured to sign the information about the lost account, the information about the target account, the resource list, and the third data by using the private key of the first account, to obtain the first data.

Optionally, the first submission unit includes: an obtaining module, configured to obtain the first data through the block chain; a verification module, configured to verify the first data through the block chain; and a recording module, configured to record the transfer event through the block chain according to the initial data after the verification succeeds.

Optionally, the verification module includes: an obtaining sub-module, configured to obtain the public key of the first account from the certificate center or an initial block of the block chain through a plurality of devices of the block chain; and a verification sub-module, configured to verify the first data by using the public key of the first account through the plurality of devices of the block chain.

Optionally, the apparatus for processing account information in a block chain may further include: a setting unit, configured to: after the authentication request is submitted to the block chain, so that the block chain records the transfer event in the block chain according to the authentication request, set a freezing period for the target account through the block chain, the resource in the target account not being allowed to be transferred within the freezing period.

Optionally, the apparatus for processing account information in a block chain may further include: a first extraction unit, configured to: after the authentication request is submitted to the block chain, so that the block chain records the transfer event in the block chain according to the authentication request, extract the initial data from the block chain, the initial data including the second data obtained by encrypting the identity information and the transfer request by using the public key of the first account; a first decryption unit, configured to decrypt the second data by using the private key of the first account, to obtain first decrypted data; a second comparison unit, configured to compare the first decrypted data and locally stored data to determine whether the first decrypted data and the locally stored data are consistent; and a first determining unit, configured to: when it is determined that the first decrypted data and the locally stored data are inconsistent through comparison, determine that the locally stored data has been tampered.

Optionally, the apparatus further includes: a second extraction unit, configured to: after the authentication request is submitted to the block chain, so that the block chain records the transfer event in the block chain according to the authentication request, extract the initial data from the block chain, the initial data including the third data obtained by signing the identity information and the transfer request by using the private key of the first account; a second decryption unit, configured to decrypt the third data by using the public key of the first account, to obtain second decrypted data; a first conversion unit, configured to hash locally stored data, to obtain hashed data; a third comparison unit, configured to compare the second decrypted data and the hashed data to determine whether the second decrypted data and the hashed data are consistent; and a second determining unit, configured to determine that the locally stored data has been tampered if it is determined through comparison that the second decrypted data and the hashed data are inconsistent.

Optionally, the apparatus for processing account information in a block chain may further include: a third extraction unit, configured to extract the initial data from the block chain according to a check instruction sent by the user, the initial data including the second data obtained by encrypting the identity information and the transfer request by using the public key of the first account, and the check instruction being used for instructing to check the second data; an encryption unit, configured to encrypt, by using the public key of the first account, the transfer request and the identity information that are sent by the user, to obtain fourth data; and a fourth comparison unit, configured to: compare the second data and the fourth data to determine whether the second data and the fourth data are consistent, to obtain a comparison result, determine, if the comparison result is yes (that is, the second data and the fourth data are consistent), that the transfer request and the identity information that are sent by the user have not been tampered, and determine, if the comparison result is no (that is, the second data and the fourth data are not consistent), that the transfer request and the identity information that are sent by the user have been tampered.

Optionally, the apparatus for processing account information in a block chain may further include: a fourth extraction unit, configured to: after the authentication request is submitted to the block chain, so that the block chain records the transfer event in the block chain according to the authentication request, extract the initial data from the block chain according to a check instruction sent by the user, the initial data including the third data obtained by signing the identity information and the transfer request by using the private key of the first account, and the check instruction being used for instructing to check the third data; a second conversion unit, configured to hash the transfer request and the identity information that are sent by the user, to obtain fifth data; a third decryption unit, configured to decrypt the third data by using the public key of the first account, to obtain third decrypted data; and a fifth comparison unit, configured to: compare the fifth data and the third decrypted data to determine whether the fifth data and the third decrypted data are consistent, to obtain a comparison result, determine, if the comparison result is yes, that the transfer request and the identity information that are sent by the user have not been tampered, and determine, if the comparison result is no, that the transfer request and the identity information that are sent by the user have been tampered.

It should be noted herein that examples and application scenarios implemented by the foregoing modules and corresponding operations are the same but are not limited to the content disclosed in the foregoing embodiments. It should be noted that the foregoing modules may be run in the hardware environment shown in FIG. 2 as a part of the apparatus for processing account information in a block chain, and may be implemented through software, or may be implemented through hardware. The hardware environment includes a network environment.

According to an embodiment, a storage medium is further provided. The storage medium stores a computer program. The computer program is configured to perform the foregoing method when being run by a computer device (or at least one processor).

According to an embodiment, an electronic apparatus is further provided. The electronic apparatus includes a memory and a processor. The memory stores a computer program. The processor is configured to perform the foregoing method through the computer program.

According to an embodiment, a server for performing the method for processing account information in a block chain is further provided. The server may serve as the foregoing electronic apparatus.

Figure 7:
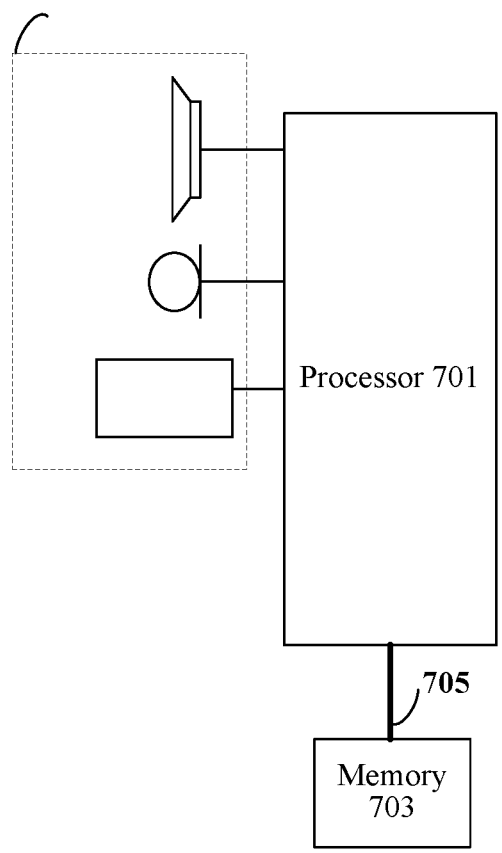
FIG. 7 is a structural block diagram of a terminal according to an embodiment.

FIG. 7 is a structural block diagram of a server according to an embodiment. As shown in FIG. 7, the server may include: one or more (although only one processor is shown in the figure, this is not limiting) processor 701, a memory 703, and a transmission apparatus 705 (such as the sending apparatus in the foregoing embodiments). As shown in FIG. 7, the terminal may further include an input/output device 707.

The memory 703 may be configured to store a software program and a module such as a program instruction/module corresponding to the method and apparatus for processing account information in a block chain in the exemplary embodiments, and the processor 701 runs the software program and the module stored in the memory 703, to execute various function applications and data processing, that is, implement the foregoing method for processing account information in a block chain. The memory 703 may include a high-speed random memory, and may also include a nonvolatile memory such as one or more magnetic storage apparatuses, a flash memory, or another nonvolatile solid-state memory. In some embodiments, the memory 703 may further include memories remotely disposed relative to the processor 701, and these remote memories may be connected to the terminal through a network. Examples of the network include, but are not limited to, the Internet, an intranet, a local area network, a mobile communications network, and a combination thereof.

The transmission apparatus 705 is configured to receive or send data via a network and may further be configured to transmit data of the processor and the memory. Specific examples of the foregoing network may include a wired network and a wireless network. In an embodiment, the transmission apparatus 705 includes a network interface controller (NIC) that may be connected to another network device and a router by using a network cable, thereby communicating with the Internet or a local area network. In an embodiment, the transmission apparatus 705 is a radio frequency (RF) module that is configured to communicate with the Internet in a wireless manner.

Specifically, the memory 703 is configured to store an application program.

The processor 701 may invoke, by using the transmission apparatus 705, the application program stored in the memory 703, so as to perform operations described below.

The processor 701 is configured to perform the following operations: receiving a transfer request and identity information that are sent by a user, the transfer request being used for requesting to transfer a resource in a lost account to a target account, and the target account being generated by a certificate center; obtaining owner information of the lost account from the certificate center according to the transfer request; comparing the identity information and the owner information; and submitting an authentication request to a block chain when determining through comparison that the identity information and the owner information are consistent, so that the block chain records a transfer event in the block chain according to the authentication request, the transfer event being used for instructing to transfer the resource in the lost account to the target account.

Optionally, the processor 701 may further be configured to perform other method operations in the foregoing embodiments.

According to the embodiments, a solution for processing account information in a block chain is provided. The identity information provided by the user and the owner information of the lost account are compared to determine whether the identity information provided by the user and the owner information of the lost account are consistent, and when it is determined through comparison that the identity information provided by the user and the owner information of the lost account are consistent, the authentication request is submitted to the block chain, to transfer the resource in the lost account to the target account in the block chain, to achieve the technical effect that a signature of a private key of the lost account does not need to be verified when the resource in the lost account is transferred to the target account, thereby solving a technical problem of account insecurity caused by loss of the private key of the account in the block chain.

Optionally, refer to the examples described in the foregoing embodiments for specific examples in this embodiment. Repetitive details are not described in this embodiment.

Persons of ordinary skill in the art may understand that, the structure shown in FIG. 7 is only schematic. Alternatively, the terminal may be a terminal device such as a smartphone (such as an Android mobile phone or an iOS mobile phone), a tablet computer, a palmtop computer, a mobile Internet device (MID), or a PAD. FIG. 7 does not limit the structure of the foregoing electronic apparatus. For example, the terminal may further include more or less components (such as a network interface and a display apparatus) than those shown in FIG. 7, or has a configuration different from that shown in FIG. 7.

Persons of ordinary skill in the art may understand that all or some of the operations of the methods of the foregoing embodiments may be implemented by a program instructing relevant hardware of the terminal device. The program may be stored in a computer readable storage medium. The storage medium may be a flash disk, a read-only memory (ROM), a random access memory (RAM), a magnetic disk, or an optical disc.

An embodiment further provides a storage medium. Optionally, in this embodiment, the storage medium may be configured to store program code for performing the method for processing account information in a block chain.

Optionally, in this embodiment, the storage medium may be located in at least one of a plurality network devices in the network shown in the foregoing embodiments.

Optionally, in this embodiment, the storage medium is configured to store program code used for performing the following operations:

S1: Receive a transfer request and identity information that are sent by a user, the transfer request being used for requesting to transfer a resource in a lost account to a target account, and the target account being generated by a certificate center.

S2: Obtain owner information of the lost account from the certificate center according to the transfer request.

S3: Compare the identity information and the owner information.

S4: Submit an authentication request to a block chain when it is determined through comparison that the identity information and the owner information are consistent, so that the block chain records a transfer event in the block chain according to the authentication request, the transfer event being used for instructing to transfer the resource in the lost account to the target account.

Optionally, the storage medium in this embodiment may be configured to store a program instruction for performing operations of the processing method in the foregoing embodiments. For specific example of this embodiment, refer to the examples described in the foregoing method embodiments. Details are not provided herein again in this embodiment.

Optionally, in this embodiment, the storage medium may include, but is not limited to: any medium that can store program code, such as a USB flash drive, a read only memory (ROM), a random access memory (RAM), a removable hard disk, a magnetic disk, or an optical disc.

If the integrated units in the foregoing embodiments are implemented in a form of software functional units and are sold or used as an independent product, the units may be stored in a computer readable storage medium. Based on such understanding, the technical solutions essentially, or some contributing to the related art technology, or all or some of the technical solutions may be implemented in a form of a software product. The computer software product is stored in a storage medium and includes several instructions for instructing one or more computer devices (which may be a personal computer, a server, a network device, or the like) to perform all or some of operations of the methods in the embodiments.

In the foregoing embodiments, descriptions of the embodiments have different emphases, and as for parts that are not described in detail in one embodiment, reference can be made to the relevant descriptions of the other embodiments.

In the several embodiments provided in the disclosure, it should be understood that the disclosed client may be implemented in other manners. The described apparatus embodiments are merely schematic. For example, division of the units is merely division of logic functions, and there may be another division manner during actual implementation. For example, multiple units or components may be combined or may be integrated into another system, or some features may be omitted or not be executed. In addition, the displayed or discussed mutual coupling, or direct coupling, or communication connections may be implemented through some interfaces. Indirect coupling or communication connections between the units or modules may be implemented in electronic or other forms.

The units described as separate parts may or may not be physically separate, and the parts displayed as units may or may not be physical units, may be located in one position, or may be distributed on a plurality of network units. Some of or all of the units may be selected according to actual needs to achieve the objectives of the solutions of the embodiments.

In addition, functional units in the embodiments may be integrated into one processing unit, or each of the units may exist alone physically, or two or more units may be integrated into one unit. The integrated units may be implemented in a form of hardware or may be implemented in a form of a software functional unit.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in some of block diagrams, communication between the components, elements or units may be performed through the bus. Functional aspects of the above exemplary embodiments may be implemented in algorithms that execute on one or more processors. Furthermore, the components, elements or units represented by a block or processing operations may employ any number of related art techniques for electronics configuration, signal processing and/or control, data processing and the like.

The above descriptions are merely optional implementations, and it should be noted that a person of ordinary skill in the art can make various improvements and refinements without departing from the spirit. All such modifications and refinements should also be intended to be covered by this application.

What is claimed is:

1. A method for processing account information in a block chain, the method being performed by a computer device, and comprising:
    receiving, by the computer device, identity information and a transfer request, the transfer request requesting to transfer a resource in a first account to a target account, the target account being generated by a certificate center;
    obtaining, by the computer device, owner information of the first account from the certificate center according to the transfer request;
    in response to determining that the identity information and the owner information are consistent, obtaining, by the computer device, first data by using a private key of a second account, the second account being a super account in the block chain; and
    generating, by the computer device, an authentication request based on the first data, without verifying a signature of a private key of the first account, and transmitting the authentication request requesting the block chain to transfer the resource in the first account to the target account.

2. The method according to claim 1, wherein the obtaining the first data comprises:
    signing initial data by using the private key of the second account, to obtain the first data, the initial data comprising information about the first account, information about the target account, the identity information, the transfer request, and a resource list that is a list of resources in the first account to be transferred.

3. The method according to claim 2, wherein the signing comprises:
    encrypting the identity information and the transfer request by using a public key of the second account, to obtain second data; and
    signing the information about the first account, the information about the target account, the resource list, and the second data by using the private key of the second account, to obtain the first data.

4. The method according to claim 2, wherein the signing comprises:
    signing the identity information and the transfer request by using the private key of the second account, to obtain third data; and
    signing the information about the first account, the information about the target account, the resource list, and the third data by using the private key of the second account, to obtain the first data.

5. The method according to claim 2, wherein the resource in the first account is transferred to the target account based on verification of the first data.

6. The method according to claim 5, wherein the verification of the first data is based on a public key of the second account.

7. The method according to claim 1, further comprising:
    with respect to the resource in the first account that has been transferred to the target account, not transmitting the authentication request to the block chain within a freezing period for the target account, the resource in the target account not being allowed to be transferred within the freezing period.

8. The method according to claim 3, further comprising:
    extracting, by the computer device, the initial data from the block chain, the initial data comprising the second data obtained by encrypting the identity information and the transfer request by using the public key of the second account;
    decrypting, by the computer device, the second data by using the private key of the second account, to obtain first decrypted data;
    comparing, by the computer device, the first decrypted data and locally stored data to determine whether the first decrypted data and the locally stored data are consistent; and
    in response to determining that the first decrypted data and the locally stored data are inconsistent, determining, by the computer device, that the locally stored data has been tampered.

9. The method according to claim 4, further comprising:
    extracting, by the computer device, the initial data from the block chain, the initial data comprising the third data obtained by signing the identity information and the transfer request by using the private key of the second account;
    decrypting, by the computer device, the third data by using a public key of the second account, to obtain second decrypted data;
    hashing, by the computer device, locally stored data, to obtain hashed data;
    comparing, by the computer device, the second decrypted data and the hashed data to determine whether the second decrypted data and the hashed data are consistent; and determining, by the computer device, that the locally stored data has been tampered in response to determining that the second decrypted data and the hashed data are inconsistent.

10. The method according to claim 3, further comprising:
extracting, by the computer device, the initial data from the block chain according to a check instruction, the initial data comprising the second data obtained by encrypting the identity information and the transfer request by using the public key of the second account, and the check instruction being used for instructing to check the second data;
encrypting, by the computer device by using the public key of the second account, the transfer request and the identity information, to obtain fourth data; and
comparing, by the computer device, the second data and the fourth data to determine whether the second data and the fourth data are consistent, determining that the transfer request and the identity information have not been tampered in response to determining that the second data and the fourth data are consistent, and determining that the transfer request and the identity information have been tampered in response to determining that the second data and the fourth data are not consistent.

11. The method according to claim 4, further comprising:
extracting, by the computer device, the initial data from the block chain according to a check instruction, the initial data comprising the third data obtained by signing the identity information and the transfer request by using the private key of the second account, and the check instruction being used for instructing to check the third data;
hashing, by the computer device, the transfer request and the identity information, to obtain fifth data;
decrypting, by the computer device, the third data by using a public key of the second account, to obtain third decrypted data; and
comparing, by the computer device, the fifth data and the third decrypted data to determine whether the fifth data and the third decrypted data are consistent, to obtain a comparison result, determining, if the comparison result is yes, that the transfer request and the identity information have not been tampered, and determining, if the comparison result is no, that the transfer request and the identity information have been tampered.

12. An apparatus for processing account information in a block chain, the apparatus comprising:
at least one memory operable to store program code; and
at least one processor operable to read the program code and operate as instructed by the program code, the at least one processor comprising at least one hardware processor and the program code comprising:
first receiving code configured to cause the at least one processor to receive identity information and a transfer request requesting to transfer a resource in a first account to a target account, the target account being generated by a certificate center;
obtaining code configured to cause the at least one processor to obtain owner information of the first account from the certificate center according to the transfer request; and
first transmission code configured to cause the at least one processor to, in response to determining that the identity information and the owner information are consistent:

obtain, by using a private key of a second account, first data, the second account being a super account in the block chain; and
generate an authentication request based on the first data, without verifying a signature of a private key of the first account, and transmit the authentication request to the block chain, the authentication request requesting the block chain to transfer the resource in the first account to the target account.

13. The apparatus according to claim 12, wherein the first transmission code comprises:
signature code configured to cause the at least one processor to sign initial data by using a private key of the second account, to obtain first data, the initial data comprising information about the first account, information about the target account, the identity information, the transfer request, and a resource list that is a list of resources in the first account to be transferred;
generation code configured to cause the at least one processor to generate the authentication request according to the first data; and
second transmission code configured to cause the at least one processor to transmit the authentication request comprising the initial data to the block chain.

14. The apparatus according to claim 13, wherein the signature code comprises:
encryption code configured to cause the at least one processor to encrypt the identity information and the transfer request by using a public key of the second account, to obtain second data; and
first signature code configured to cause the at least one processor to sign the information about the first account, the information about the target account, the resource list, and the second data by using the private key of the second account, to obtain the first data.

15. The apparatus according to claim 13, wherein the signature code comprises:
second signature code configured to cause the at least one processor to sign the identity information and the transfer request by using the private key of the second account, to obtain third data; and
third signature code configured to cause the at least one processor to sign the information about the first account, the information about the target account, the resource list, and the third data by using the private key of the second account, to obtain the first data.

16. The apparatus according to claim 13, wherein the resource in the first account is transferred to the target account based on verification of the first data.

17. The apparatus according to claim 16, wherein the verification of the first data is based on a public key of the second account.

18. The apparatus according to claim 12, wherein the first transmission code causes the at least one processor to, with respect to the resource in the first account that has been transferred to the target account, not transmit the authentication request to the block chain within a freezing period for the target account, the resource in the target account not being allowed to be transferred within the freezing period.

19. The apparatus according to claim 14, wherein the program code further comprises:
first extraction code configured to cause the at least one processor to extract the initial data from the block chain, the initial data comprising the second data obtained by encrypting the identity information and the transfer request by using the public key of the second account;

first decryption code configured to cause the at least one processor to decrypt the second data by using the private key of the second account, to obtain first decrypted data;

comparison code configured to cause the at least one processor to compare the first decrypted data and locally stored data to determine whether the first decrypted data and the locally stored data are consistent; and first determining code configured to cause the at least one processor to, in response to determining that the first decrypted data and the locally stored data are inconsistent based on a result of comparison, determine that the locally stored data has been tampered.

20. A non-transitory computer readable storage medium, storing a computer program executable by at least one processor to cause the at least one processor to perform:

receiving identity information and a transfer request, the transfer request requesting to transfer a resource in a first account to a target account, the target account being generated by a certificate center;

obtaining owner information of the first account from the certificate center according to the transfer request;

in response to determining that the identity information and the owner information are consistent, obtaining first data by using a private key of a second account, the second account being a super account in the block chain; and generating an authentication request based on the first data, without verifying a signature of a private key of the first account, and transmitting the authentication request requesting the block chain to transfer the resource in the first account to the target account.

* * * * *